United States Patent [19]

Sheldon

[11] Patent Number: 5,284,006
[45] Date of Patent: Feb. 8, 1994

[54] COMBINATION MOWER BLADE

[75] Inventor: John D. Sheldon, Orangeburg, S.C.

[73] Assignee: White Consolidated Industries, Inc., Cleveland, Ohio

[21] Appl. No.: 897,009

[22] Filed: Jun. 11, 1992

[51] Int. Cl.⁵ .............................................. A01D 34/82
[52] U.S. Cl. ...................................... 56/255; 56/295; 56/DIG. 17
[58] Field of Search ........ 56/17.5, 225, 295, DIG. 17, 56/DIG. 20

[56] References Cited

U.S. PATENT DOCUMENTS

| | | |
|---|---|---|
| 2,791,080 | 5/1957 | Shaw . |
| 2,836,024 | 5/1958 | Davis . |
| 3,032,957 | 5/1962 | Boyer . |
| 3,080,697 | 3/1963 | Mauro . |
| 3,085,386 | 4/1963 | Slemmons . |
| 3,191,371 | 6/1965 | Brewer ................... 56/295 |
| 3,220,170 | 11/1965 | Smith et al. ................ 56/255 |
| 3,242,660 | 3/1966 | Gary ...................... 56/25.4 |
| 3,338,039 | 8/1967 | Nightingale et al. ........... 56/295 |
| 3,780,509 | 12/1973 | Woelffer .................. 56/295 |
| 3,869,848 | 3/1975 | Larsen .................... 56/295 |
| 3,884,020 | 5/1975 | Dahl ..................... 56/320.2 |
| 3,910,017 | 10/1975 | Thorud et al. .............. 56/295 |
| 4,134,249 | 1/1979 | Wuerker et al. ............. 56/255 |
| 4,189,903 | 2/1980 | Jackson ................... 56/255 |
| 4,205,512 | 6/1980 | Thorud ................... 56/13.4 |
| 4,214,426 | 7/1980 | Lindbald .................. 56/295 |
| 4,290,258 | 9/1981 | Gobler ................... 56/295 |
| 4,292,791 | 10/1981 | Lalonde .................. 56/255 |
| 4,318,268 | 3/1982 | Szymanis ................. 56/255 |
| 4,559,769 | 12/1985 | Seyerle .................. 56/295 |
| 4,617,788 | 10/1986 | Sebastian ................. 56/295 |
| 4,686,819 | 8/1987 | Bryant ................... 56/295 |
| 4,936,884 | 6/1990 | Campbell ................. 56/12.7 |
| 4,951,449 | 8/1990 | Thorud .................... 56/2 |
| 4,977,735 | 12/1990 | Davis .................... 56/295 |
| 4,995,228 | 2/1991 | Hladik, Jr. ................ 56/255 |
| 5,012,633 | 5/1991 | Ito et al. ................. 56/12.9 |
| 5,019,113 | 5/1991 | Burnell .................. 56/295 |
| 5,035,108 | 7/1991 | Meyer et al. .............. 56/13.4 |
| 5,069,025 | 12/1991 | Iversen .................. 56/295 |
| 5,090,183 | 2/1992 | Thorud et al. ............... 56/2 |
| 5,094,065 | 3/1992 | Azbell ................... 56/255 |

Primary Examiner—Terry Lee Melius
Attorney, Agent, or Firm—Pearne, Gordon, McCoy & Granger

[57] ABSTRACT

A mower blade suitable for bagging, side discharge and mulching is provided. A laterally upswept outboard cutting portion cuts the grass and sucks the clippings upwardly. The clippings are forced by the combined effects of the upswept outboard cutting portion and an upswept inboard cutting portion into an intermediate cutting portion where they are further comminuted and are then sucked back into both the outboard cutting portion and the inboard cutting portion. These double circulation paths result in excellent comminution and superior hiding of the clippings.

16 Claims, 2 Drawing Sheets

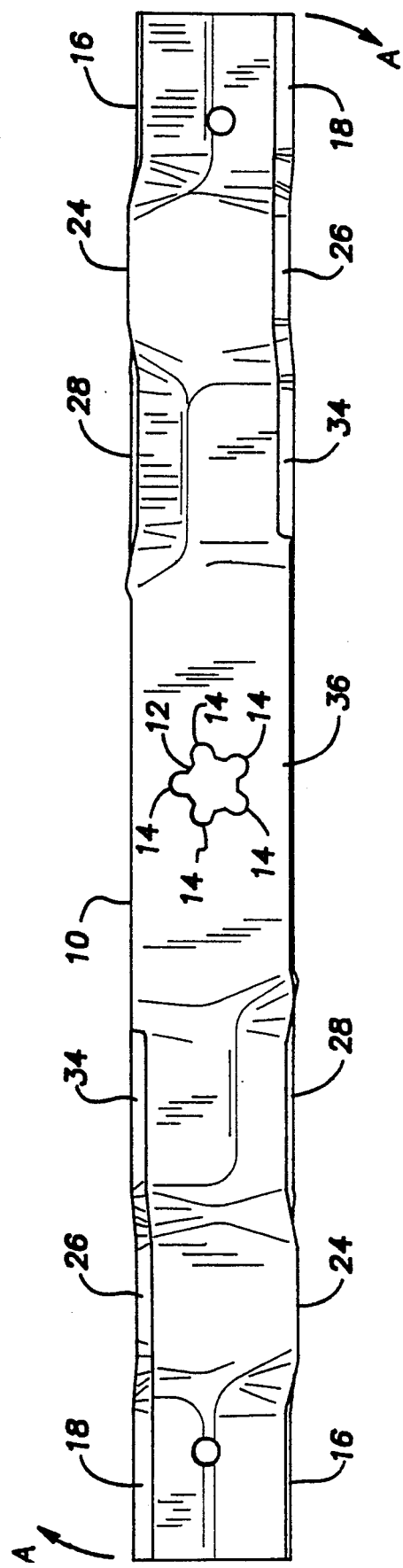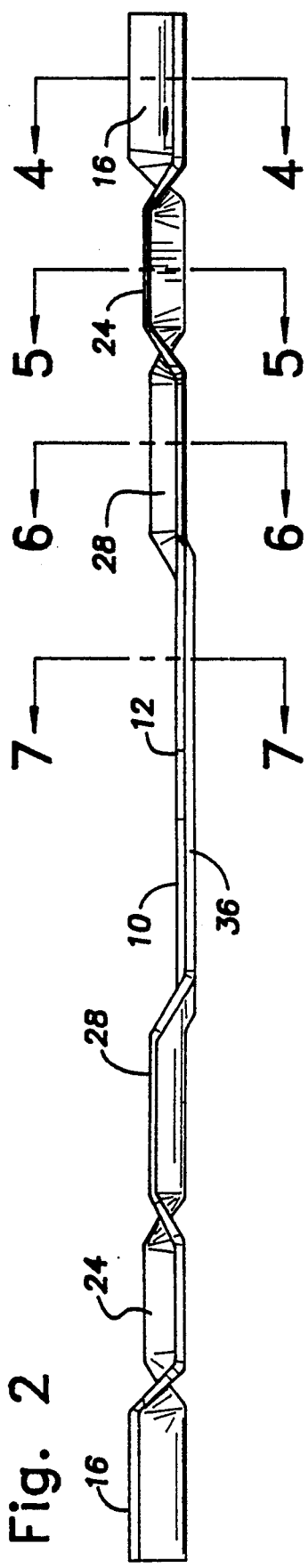

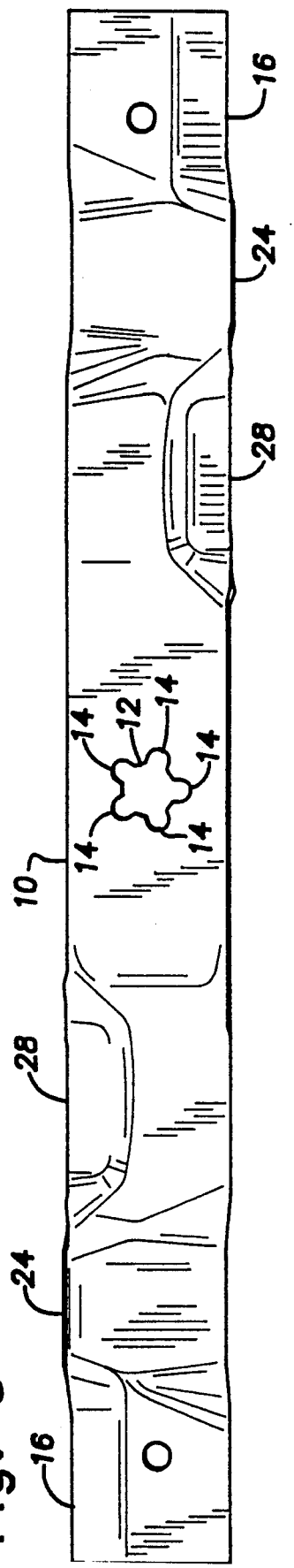
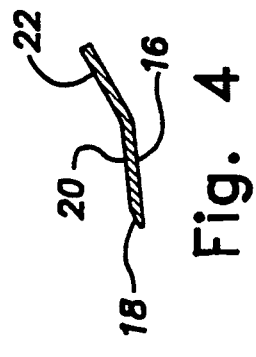
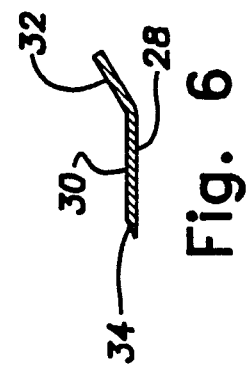
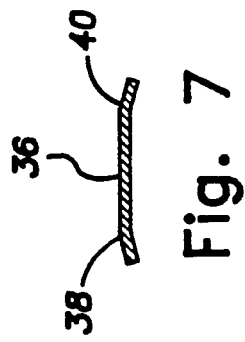

COMBINATION MOWER BLADE

BACKGROUND OF THE INVENTION

The present invention relates to lawn mower blades and particularly to mulching blades for rotary lawn mowers.

Until recent times, most owners of lawn tractors and walk-behind mowers preferred to collect the grass clippings as they mowed.

It has now been recognized that these clippings represent a substantial burden on the capacity of landfills and other disposal means. In some areas, legislation has been passed that forbids the deposition of clippings in landfills.

Because of these factors and a general increase in environmental awareness, many owners now wish to leave the clippings where they fall.

Unfortunately, this may result in unattractive debris clearly overlaying the lawn, which in some cases may actually damage the lawn. To help minimize this, specialized mulching mowers have been proposed.

These mowers tend to be expensive and are typically ill-suited to be used as a conventional mower should the need arise (e.g., unusually high and/or wet grass).

To provide an alternative to specialized mowers, various mulching blades have been proposed for use in a conventional mower. The main purpose of these blades is to cut the grass fine enough to allow the debris to find its way down to the soil level where it forms a mulch.

While almost any blade will prove adequate if only a short length of un-wetted grass is cut, it has been difficult to produce clippings that are both properly comminuted and evenly spread or "hidden" when more typical conditions are encountered.

It has been particularly difficult to achieve satisfactory hiding of the clippings.

SUMMARY OF THE INVENTION

A rotary mower blade is formed from a rigid elongate strip. The blade has a central mounting portion for attaching the blade to a rotating shaft on the mower. The blade rotates about the central mounting portion in a substantially horizontal plane.

The blade has a laterally upswept outboard portion including a leading cutting edge and an intermediate portion including a leading cutting edge. The intermediate portion cutting edge is in a plane vertically above the outer and inner portion cutting edge. The blade also has a laterally upswept inboard portion.

In the preferred embodiment, the intermediate portion is laterally downswept and the outboard portion has a leading region laterally upswept at a first angle and a trailing region laterally upswept at a second angle greater than the first angle.

In addition, the inboard portion includes a leading cutting edge, a leading horizontal region and a trailing region laterally upswept at a third angle.

The preferred embodiment also has a mounting hole in the central portion having five petal-like keyways.

This blade provides excellent mulching including hiding. In addition, it can still be used satisfactorily for side discharge and bagging should the need arise.

The outboard portion cuts the grass to the desired height. The upswept character of the outboard portion sucks these initially cut clippings toward the top of the mower housing, where they are forced by the combined effects of the inner and outer upswept portions down into the path of the cutting edge on the intermediate portion. As the clippings are cut again, part of them are sucked up again through the path of the outboard portion and another part is now sucked up through the path of the inboard portion which is also upswept. Both the outboard and inboard portions act to circulate the clippings until they eventually fall free of the mower after being finely comminuted.

These double circulating circuits provide superior hiding of the clippings.

BRIEF DESCRIPTION OF THE DRAWINGS

FIG. 1 is top plan view of a rotary mower blade according to the invention.

FIG. 2 is a front elevation view of the blade of FIG. 1.

FIG. 3 is a bottom plan view of the blade of FIG. 1.

FIGS. 4, 5, 6 and 7 are cross sectional views along the lines 4—4, 5—5, 6—6, and 7—7, respectively, in FIG. 2.

DESCRIPTION OF THE PREFERRED

Referring to FIGS. 1-3, a rotary mower blade 10 is formed from a strip of steel. A centrally located mounting hole 12 is provided for attaching the blade 10 to an engine drive shaft or rotating mandrel within an unshown mower housing, where it rotates in a substantially horizontal plane. In operation, the blade 10 rotates about the center of the hole 12 as indicated by the arrows A.

In the preferred embodiment, the hole 12 is provided with five petal-like keyways 14 that would engage with matching keys of the shaft.

The outboard portion 16 of the blade 10 has a cutting edge 18 on its leading edge and is laterally upswept. Referring to FIG. 4, the lateral upsweep takes place in two parts. The first section 20 starts a gradual upsweep and the second section 22 is more aggressive. The first section 20 may be, for example, 6° from horizontal and the second section 22 at 20°.

The intermediate portion 24 of the blade 10 has a cutting edge 26 on its leading edge. The cutting edge 26 is located in a plane that is above the cutting plane of the cutting edge 18. In the preferred embodiment of the invention, the intermediate portion 24 is laterally downswept, for example, at 13° from horizontal. This angle can be varied to alter the amount of recirculation of the grass clippings (for example, 0°-30°).

The inboard portion 28 of the blade 10 is laterally upswept. Referring to FIG. 6, the lateral upsweep takes place in two parts. The first section 30 is at or near horizontal and the second section 32 is more aggressive. The second section 32 may be, for example, 31° from horizontal.

In the preferred embodiment of the invention, the inboard portion 28 is also provided with a cutting edge 34 on its leading edge. The cutting edge 34 is located in a plane that is below the cutting plane of the cutting edge 26. The cutting edge 34 provides additional comminuting of the clippings.

The mounting hole 12 is located in a central mounting portion 36 of the blade 10. To strengthen the blade 10, the mounting portion 36 may be provided with bends 38, 40 at its edges.

The blade 10 may be advantageously cut from a steel strip, formed into the disclosed shape and hardened.

The cutting edges 18, 26, 34 may be a continuous cutting edge formed in the leading edge of the blade 10 prior to the forming of the portions 16, 24, 28, 36.

In the preferred embodiment the portions 16, 24, 28 are of roughly equal longitudinal width and together constitute about a third of the length of the blade 10 (or two-thirds including both ends of the blade). The blade 10 may be, for example, produced from a blank 21 inches in length, 2-¼ inches in width and 0.13 inches thick.

When the blade 10 is used in a rotary mower, the cutting edge 18 cuts the grass to the desired height. The clippings are then sucked upward inside the mower by the laterally upswept sections 20, 22.

The clippings then are forced by the combined effects of the upswept inboard portion 28 and the upswept outboard portion 16 into the path of the cutting edge 26 where they are again cut. As the clippings leave the intermediate portion 24, part of them are sucked back up through the path of the outboard portion 16 and part of them are sucked up through the path of the inboard portion 28.

As this process continues, the clippings are repeatedly comminuted by the cutting edges 18, 26, 34 and eventually fall to the ground, their small size permitting them to make their way to the base of the grass to form a mulch.

The double circulation paths produced by the inboard portion 28 and the outboard portion 16 provides hiding of the clippings superior to that heretofore observed.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed :

1. A rotary mower blade for cutting grass, said comprising a rigid elongate strip having:
   a central mounting portion for attaching said blade to rotate about said central mounting portion in a substantially horizontal plane;
   means for producing a first grass circulation path comprising a laterally upswept outboard portion including a leading cutting edge;
   an intermediate portion including a leading cutting edge, said intermediate portion cutting edge being in a plane vertically above said outer portion cutting edge; and
   means for producing a second grass circulation path comprising a laterally upswept inboard portion, said intermediate portion providing a common path for said first and second circulation paths.

2. A rotary mower blade according to claim 1, wherein said intermediate portion is laterally downswept.

3. A rotary mower blade according to claim 2, wherein said intermediate portion is laterally downswept at about 13° from horizontal.

4. A rotary mower blade according to claim 1, wherein said outboard portion has a leading region laterally upswept at a first angle and a trailing region laterally upswept at a second angle greater than the first angle.

5. A rotary mower blade according to claim 4, wherein said first angle is about 6° and said second angle is about 20°, both from horizontal.

6. A rotary mower blade according to claim 1, wherein said inboard portion has a leading horizontal region and a trailing region laterally upswept at a third angle.

7. A rotary mower blade according to claim 6, wherein said third angle is about 31° from horizontal.

8. A rotary mower blade according to claim 1, wherein said inboard portion includes a leading cutting edge.

9. A rotary mower blade according to claim 8, wherein said inboard portion cutting edge is in a plane vertically below said intermediate portion cutting edge.

10. A rotary mower blade according to claim 1, wherein said central mounting portion includes a mounting hole having five petal-like keyways.

11. A rotary mower blade according to claim 1, wherein said central mounting portion has a leading and trailing edge bend for reinforcement.

12. A rotary mower blade for cutting grass, said blade comprising a rigid elongate strip having:
   a central mounting portion for attaching said blade to rotate about said central mounting portion in a substantially horizontal plane, said central mounting portion having a leading and trailing edge bend for reinforcement;
   means for producing a first grass circulation path comprising a laterally upswept outboard portion including a leading cutting edge, said outboard portion having a leading region laterally upswept at a first angle and a trailing region laterally upswept at a second angle greater than the first angle;
   a laterally downswept intermediate portion including a leading cutting edge, said intermediate portion cutting edge being in a plane vertically above said outer portion cutting edge; and
   means for producing a second grass circulation path comprising a laterally upswept inboard portion including a leading cutting edge, said inboard portion having a leading horizontal region and a trailing region laterally upswept at a third angle, said inboard portion cutting edge being in a plane vertically below said intermediate portion cutting edge, said intermediate portion providing a common path for said first and second circulation paths.

13. A rotary mower blade according to claim 12, wherein said intermediate portion is laterally downswept at about 13° from horizontal.

14. A rotary mower blade according to claim 12, wherein said first angle is about 6° and said second angle is about 20°, both from horizontal.

15. A rotary mower blade according to claim 12, wherein said third angle is about 31° from horizontal.

16. A rotary mower blade according to claim 12, wherein said central mounting portion includes a mounting hole having five petal-like keyways.

* * * * *

UNITED STATES PATENT AND TRADEMARK OFFICE
CERTIFICATE OF CORRECTION

PATENT NO. : 5,284,006

DATED : February 8, 1994

INVENTOR(S) : John D. Sheldon

It is certified that error appears in the above-identified patent and that said Letters Patent is hereby corrected as shown below:

Col. 3,
Claim 1, line 1, after "said" insert --blade--.

Signed and Sealed this

Nineteenth Day of July, 1994

Attest:

BRUCE LEHMAN

Attesting Officer     Commissioner of Patents and Trademarks